United States Patent
Satterfield

(10) Patent No.: US 9,260,039 B1
(45) Date of Patent: Feb. 16, 2016

(54) CAR SEAT DEVICE

(71) Applicant: Phil Satterfield, Cranberry Township, PA (US)

(72) Inventor: Phil Satterfield, Cranberry Township, PA (US)

( * ) Notice: Subject to any disclaimer, the term of this patent is extended or adjusted under 35 U.S.C. 154(b) by 0 days.

(21) Appl. No.: 14/534,889

(22) Filed: Nov. 6, 2014

(51) Int. Cl.
*B60N 2/28* (2006.01)
*B62B 7/12* (2006.01)

(52) U.S. Cl.
CPC ............ *B60N 2/2848* (2013.01); *B60N 2/2821* (2013.01); *B62B 7/12* (2013.01)

(58) Field of Classification Search
CPC ............ B62B 9/10; B62B 9/102; B62B 9/12; B62B 7/00; B62B 7/006; B62B 7/04; B62B 7/06; B62B 7/14; B62B 7/142; B62B 7/145; B62B 7/12; B62B 7/105; B62B 5/08; B62B 5/082; B62B 5/085; B60N 2/26; B60N 2/2848; B60N 2/2821; B60N 2/28; B60N 2/2806; B60N 2/2842; B60N 2/2845
See application file for complete search history.

(56) References Cited

U.S. PATENT DOCUMENTS

| | | | |
|---|---|---|---|
| 4,678,196 A | | 7/1987 | Van Steenburg |
| 4,828,281 A | * | 5/1989 | Sanchas .......................... 280/30 |
| 4,874,182 A | * | 10/1989 | Clark .............................. 280/30 |
| 4,896,894 A | | 1/1990 | Singletary |
| D383,711 S | | 9/1997 | Smithley |
| 6,296,259 B1 | * | 10/2001 | Anderson ........................ 280/30 |
| 6,729,630 B2 | | 5/2004 | Szmidt et al. |
| 6,793,280 B2 | | 9/2004 | Washizuka et al. |
| 6,938,915 B2 | * | 9/2005 | Bischoff et al. ............... 280/658 |
| 6,986,518 B1 | | 1/2006 | Besaw |
| 7,540,507 B1 | * | 6/2009 | Kennedy ......................... 280/30 |
| 7,600,766 B2 | * | 10/2009 | Erskine ..................... 280/47.25 |
| 7,624,954 B2 | | 12/2009 | Randle, Jr. et al. |
| 7,658,399 B2 | | 2/2010 | Van Dijk |
| 8,033,555 B2 | | 10/2011 | Mostert et al. |
| 8,727,439 B2 | * | 5/2014 | Herzberg ................... 297/250.1 |
| 8,936,254 B2 | * | 1/2015 | Viana et al. ...................... 280/30 |
| 9,108,654 B2 | * | 8/2015 | Kozinski .................. B62B 7/08 |
| 9,162,697 B2 | * | 10/2015 | Perez .................... B62B 5/0083 |
| 2002/0060444 A1 | * | 5/2002 | Cote ............................. 280/648 |
| 2013/0257022 A1 | | 10/2013 | Li |

FOREIGN PATENT DOCUMENTS

WO    WO0132493    5/2001

* cited by examiner

*Primary Examiner* — James M Dolak

(57) ABSTRACT

A car seat assembly includes a first base coupled to a vehicle seat. The first base is structured to have a pair of wheel wells. A seat is provided to support a child. A second base is provided. The seat is coupled to the second base. A pair of legs is coupled to the base. Each of the legs is structured to form a scissor such that each of the legs is positionable between an extended position and a retracted position. A plurality of wheels is each rotatably coupled to an associated one of the legs. Each of the wheels engages a respective one of the wheel wells such that the second base is removably coupled to the first base. Each of the wheels abuts a support surface such that the seat may be rolled along the support surface after the second base is removed from the first base.

10 Claims, 5 Drawing Sheets

CAR SEAT DEVICE

BACKGROUND OF THE DISCLOSURE

Field of the Disclosure

The disclosure relates to seat devices and more particularly pertains to a new seat device for being utilized as both a cart and a car seat.

SUMMARY OF THE DISCLOSURE

An embodiment of the disclosure meets the needs presented above by generally comprising a first base coupled to a vehicle seat. The first base is structured to have a pair of wheel wells. A seat is provided to support a child. A second base is provided. The seat is coupled to the second base. A pair of legs is coupled to the base. Each of the legs is structured to form a scissor such that each of the legs is positionable between an extended position and a retracted position. A plurality of wheels is each rotatably coupled to an associated one of the legs. Each of the wheels engages a respective one of the wheel wells such that the second base is removably coupled to the first base. Each of the wheels abuts a support surface such that the seat may be rolled along the support surface after the second base is removed from the first base.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
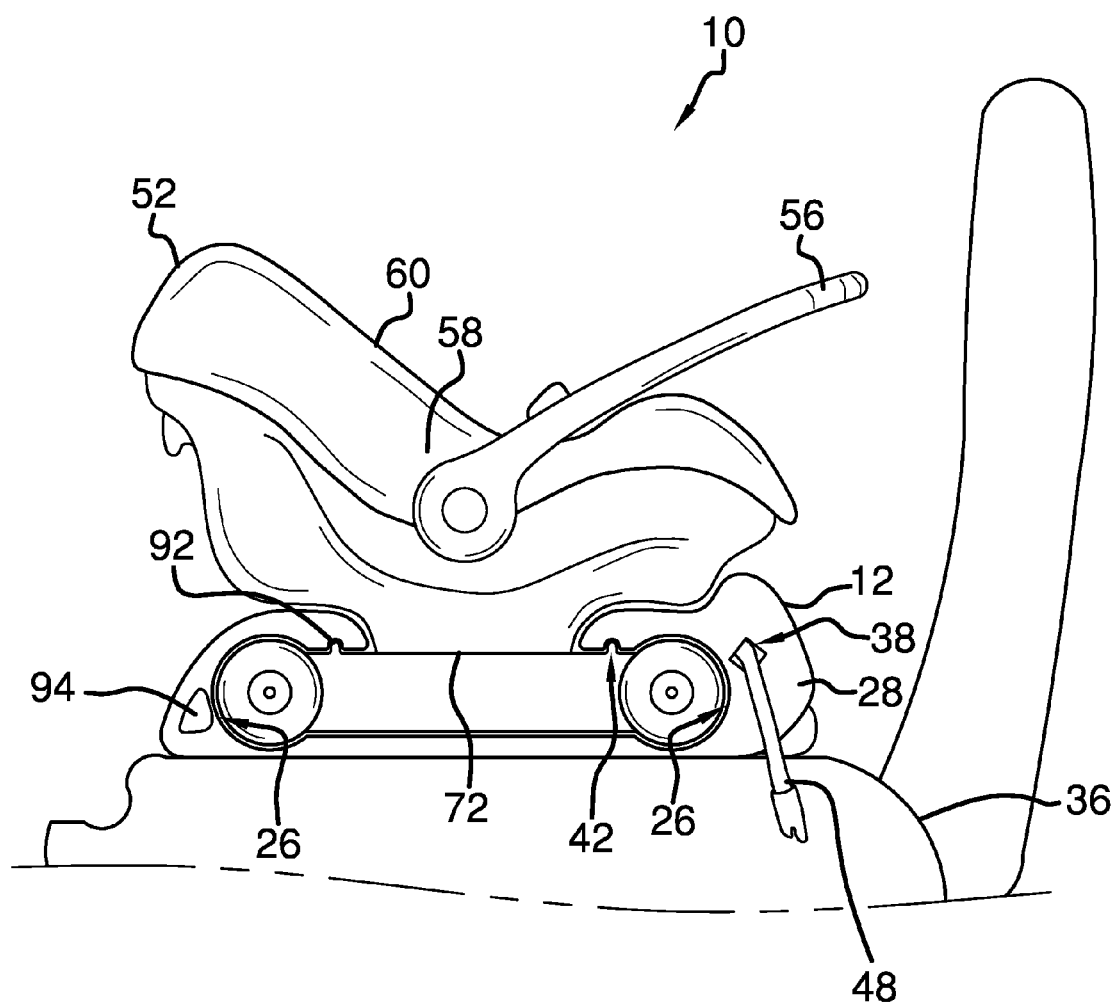
FIG. 1 is a right side view of a car seat assembly according to an embodiment of the disclosure in a retracted position.
Figure 2:
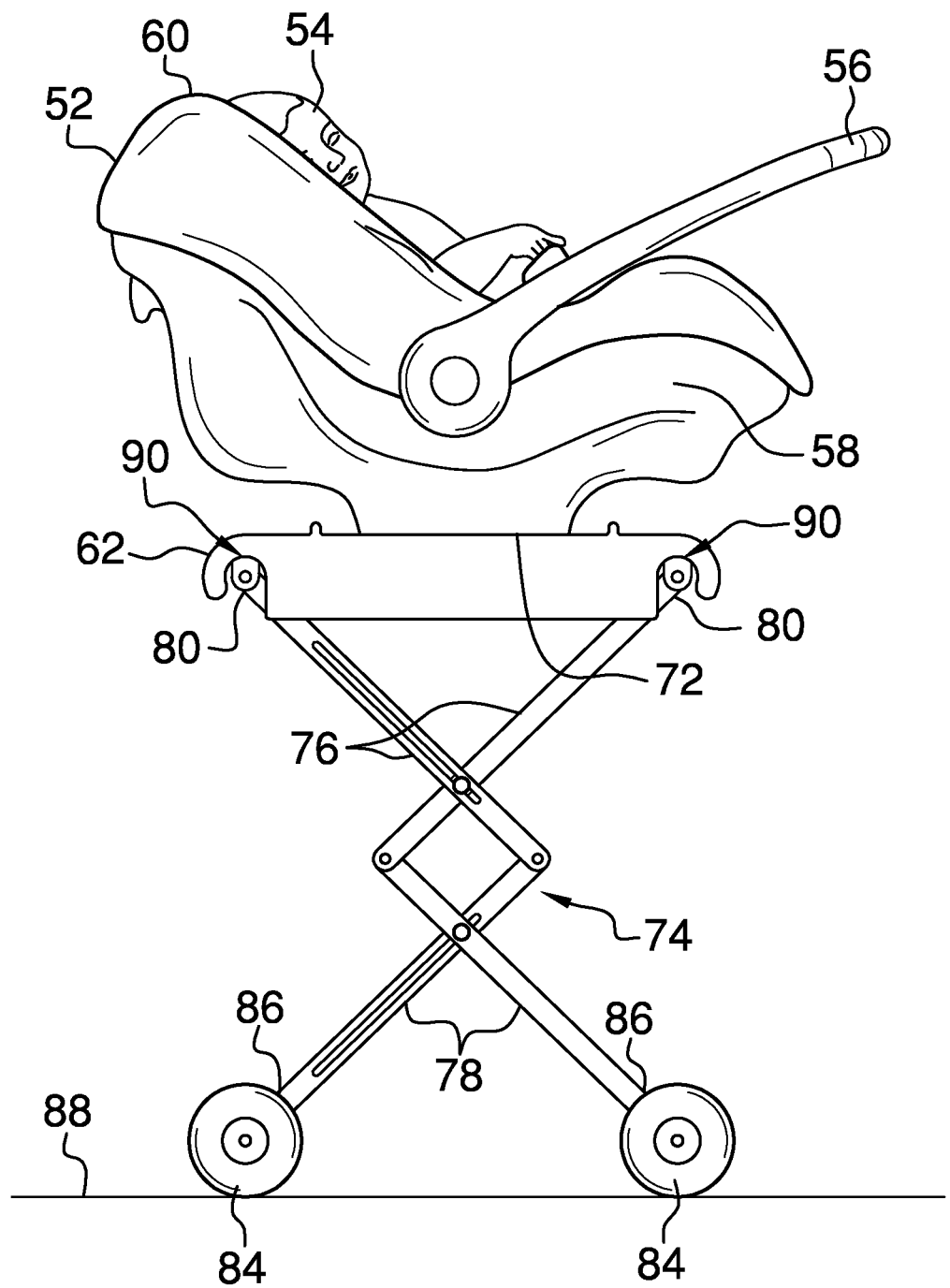
FIG. 2 is a right side view of an embodiment of the disclosure in an extended position.
Figure 3:
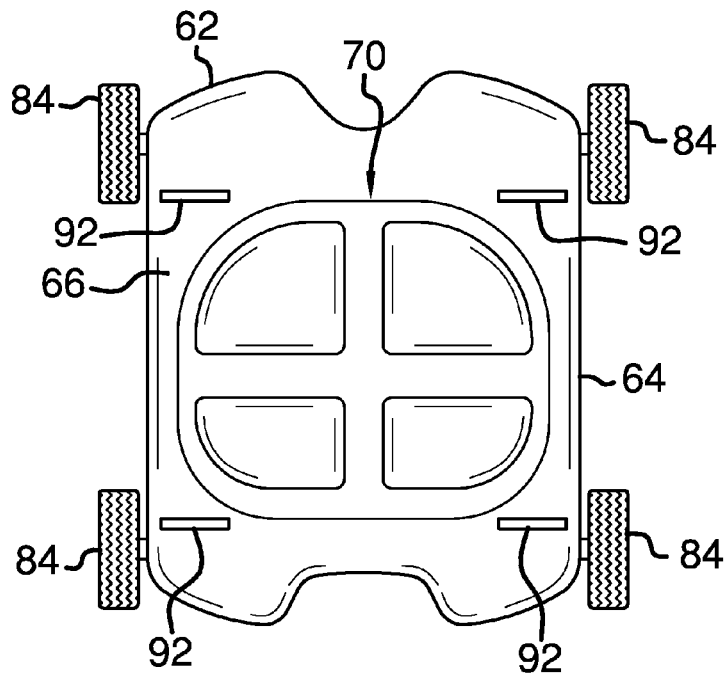
FIG. 3 is a top view of an embodiment of the disclosure.
Figure 4:
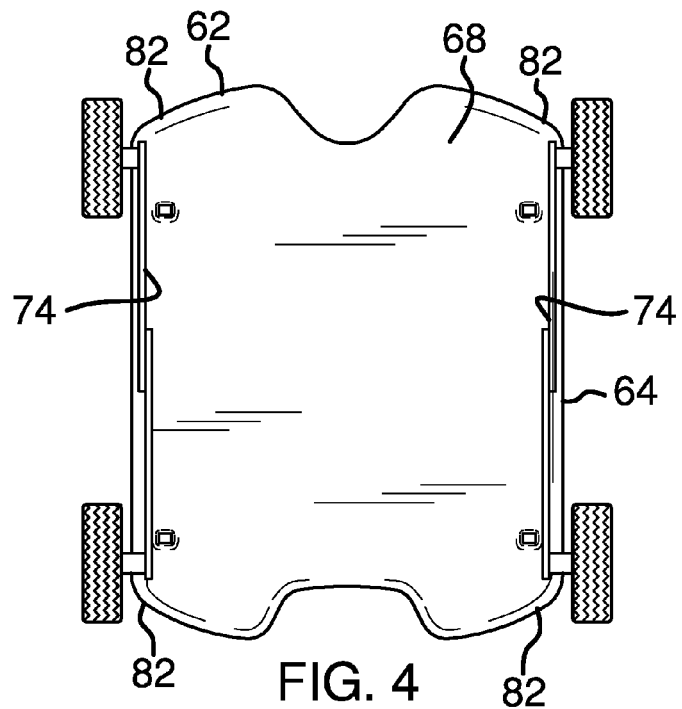
FIG. 4 is a bottom view of an embodiment of the disclosure.
Figure 5:
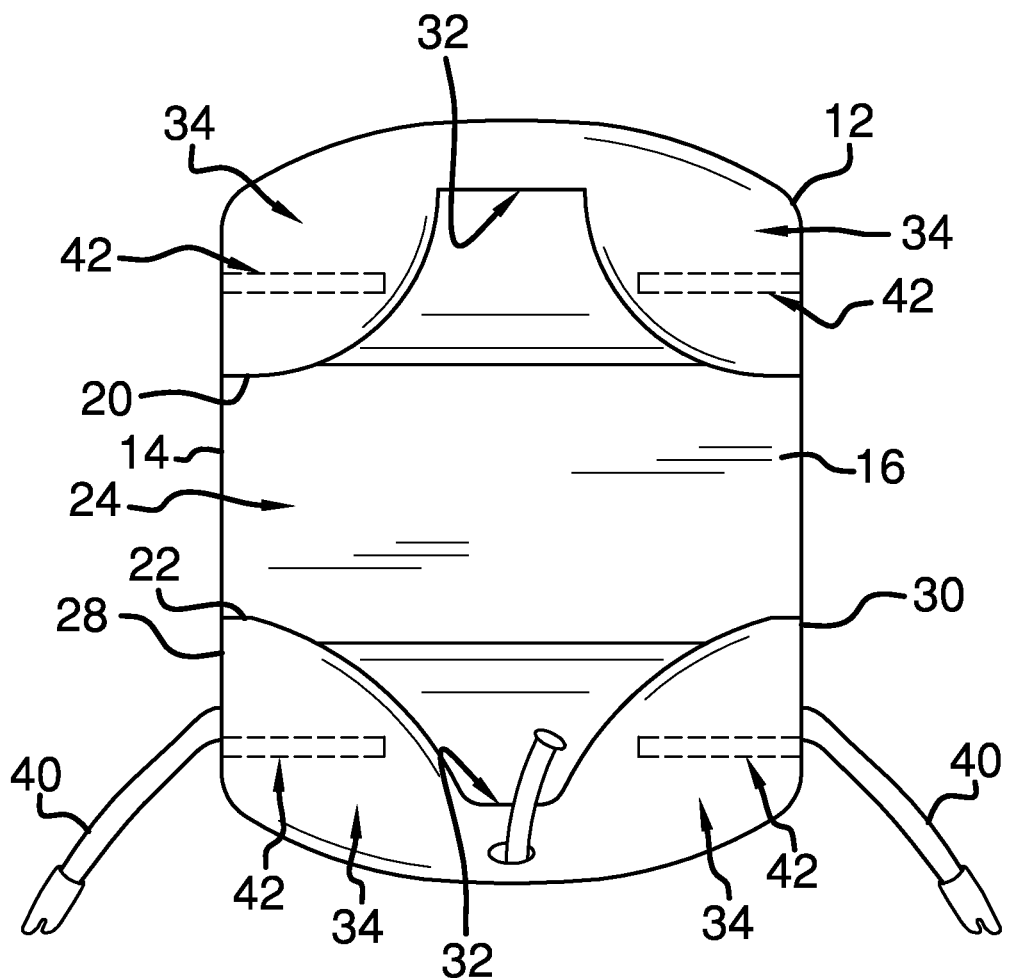
FIG. 5 is a top perspective view of an embodiment of the disclosure.
Figure 6:
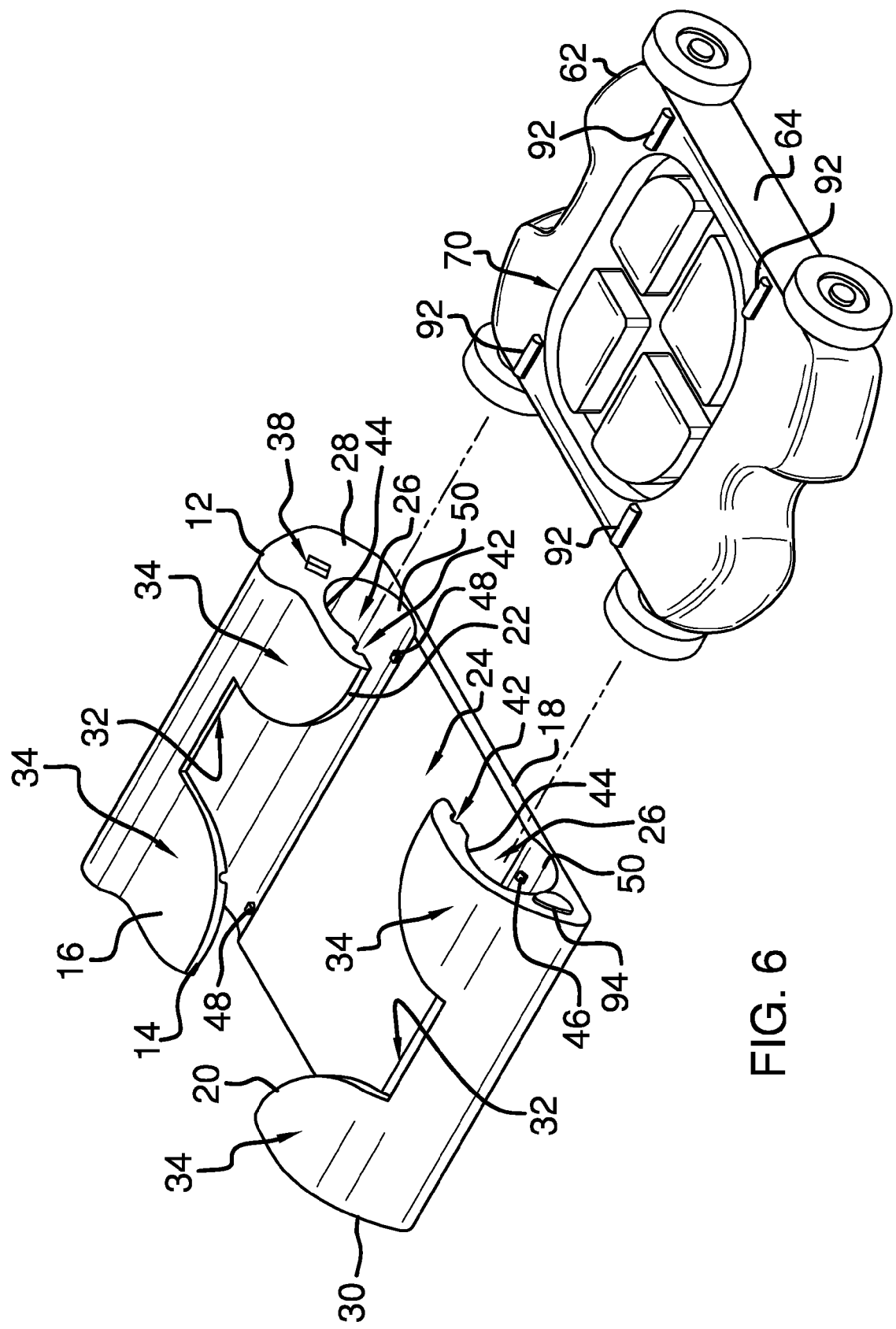
FIG. 6 is a perspective view of an embodiment of the disclosure.

With reference now to the drawings, and in particular to FIGS. 1 through 6 thereof, a new seat device embodying the principles and concepts of an embodiment of the disclosure and generally designated by the reference numeral 10 will be described.

As best illustrated in FIGS. 1 through 6, the car seat assembly 10 generally comprises a first base 12. The first base 12 comprises an exterior edge 14 extending between each of a top side 16 and a bottom side 18 of the first base 12. The top side 16 of the first base 12 curves upwardly and inwardly. Thus, each of a front side 20 and a rear side 22 of the exterior edge 14 are directed toward a center 24 of the first base 12 to define a pair of wheel wells 26. Each of the wheel wells 26 extends between a first lateral side 28 and a second lateral side 30 of the exterior edge 14. Each of the front side 20 and the rear side 22 of the exterior edge 14 has a respective cut out 32 extending toward an associated one of the wheel wells 26. Each of the cut outs 32 defines a respective pair of lobes 34 on each of the wheel wells 26.

The first base 12 is removably coupled to a vehicle seat 36 such that the bottom side 18 of the first base 12 abuts the vehicle seat 36. The first base 12 has a pair of belt wells 38 each extending inwardly on an associated one of the first lateral side 28 and the second lateral side 30 of the exterior edge 14. A pair of belts 40 is coupled to the first base 12. Each of the belts 40 extends outwardly from an associated one of the belt wells 38. Each of the belts 40 engages the vehicle seat 36 to retain the first base 12 on the vehicle seat 36.

The first base 12 has a pair of grooves 42 each extending into the top side 16 of the first base 12. Each of the grooves 42 is positioned on an upper side 44 of an associated one of the wheel wells 26. Additionally, each of the grooves 42 extends between the first lateral side 28 and the second lateral side 30 of the exterior edge 14. A first set of locks 46 and a second set of locks 48 are each movably coupled to and extend upwardly from the top side 16 of the first base 12. Each of the first set of locks 46 and the second sets of locks 48 are positioned on a respective lower side 50 of an associated one of the wheel wells 26.

A seat 52 is provided. The seat 52 supports an child 54. The seat 52 may be a child car seat or the like. A handle 56 is movably coupled between each of a first oblique side 58 and a second oblique side 60 of the seat 52. The handle 56 may be gripped to manipulate the seat 52.

A second base 62 is provided. The second base 62 has an outermost edge 64 extending between a topmost side 66 and a bottommost side 68 of the second base 62. The topmost side 66 has a seat well 70 extending downwardly therein. A lowermost side 72 of the seat 52 is positionable in the seat well 70 such that the seat 52 is removably coupled to the second base 62.

A pair of legs 74 is provided. Each of the legs 74 comprises a respective pair of first arms 76 each slidably coupled to a respective pair of second arms 78. Thus, each of the legs 74 is structured to form a scissor such that each of the legs 74 is positionable between an extended position and a retracted position. A coupled end 80 of each of the respective first arms 76 is hingedly coupled to the bottommost side 68 of the second base 62. The coupled end 80 of the respective first arms 76 is each positioned proximate an associated one of four corners 82 of the second base 62.

Each of a plurality of wheels 84 is rotatably coupled to an associated free end 86 of each of the respective second arms 78. Each of the wheels 84 slidably engages a respective one of the wheel wells 26. Thus, the second base 62 is urged laterally with respect to the first base 12 to couple and uncouple the second base 62 and the first base 12. Each of the wheels 84 abuts a support surface 88 such that the second base 62 and the seat 52 may be rolled along the support surface 88 after the second base 62 is uncoupled from the first base 12.

The outermost edge 64 of the second base 62 has a plurality of wheel slots 90 extending inwardly therein. Each of the wheel slots 90 is positioned adjacent to an associated one of the four corners 82 of the second base 62. Each of the wheels 84 is positioned within an associated one of the wheel slots 90 when each of the legs 74 is positioned in the retracted position.

The second base 62 has a plurality of tabs 92 coupled to and extending upwardly from the topmost side 66 of the second base 62. Each of the tabs 92 is positioned proximate an associated one of the four corners 82 of the second base 62. Moreover, each of the tabs 92 slidably engages an associated one of the grooves 42. Thus, the second base 62 is maintained in alignment with the first base 12 when the second base 62 is coupled to the first base 12. Each of the first set of locks 46 and the second set of locks 48 engages the bottommost side 68 of the second base 62. Consequently, the second base 62 is retained on the first base 12 when the second base 62 is coupled to the first base 12.

A release button 94 is movably coupled to the first lateral side 28 of the exterior edge 14 of the first base 12. The release button 94 is mechanically coupled to each of the first set of locks 46 and the second set of locks 48. The release button 94 is engaged to release each of the first set of locks 46 and the second set of locks 48 from the second base 62 such that the second base 62 may be uncoupled from the first base 12.

In use, the second base 62 is coupled to the first base 12 when the seat 52 is to be coupled to the vehicle seat 36. The second base 62 is urged laterally rather than being urged vertically when the second base 62 is coupled and uncoupled from the first base 12. Consequently, the second base 62 is removable from the first base 12 without needing to be lifted. Each of the legs 74 are positioned in the extended position so the second base 62 is utilized as a cart. The handle 56 is gripped to push the second base 62 and the seat 52 along the support surface 88.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A car seat assembly comprising:
    a first base configured to be coupled to a vehicle seat, said first base being structured to have a pair of wheel wells;
    a car seat configured to support a child;
    a second base coupled to said car seat;
    a pair of legs coupled to said second base, each of said legs being structured to form a scissor such that each of said legs is positionable between an extended position and a retracted position;
    a plurality of wheels each rotatably coupled to an associated one of said legs, each of said wheels engaging a respective one of said wheel wells such that said second base is removably coupled to said first base, each of said wheels abutting a support surface such that said seat may be rolled along the support surface after said second base is removed from said first base, wherein each of said wheels is slidably insertable into said respective one of said wheel wells such that said second base is movable laterally relative to said first base to couple and uncouple said second base to said first base;
    said first base having a pair of grooves;
    said second base having a plurality of tabs coupled to and extending upwardly from a topmost side of said second base, each of said tabs being positioned proximate an associated one of four corners of said second base; and
    each of said tabs slidably engaging an associated one of said grooves such that said second base is maintained in alignment with said first base when said second base is coupled to said first base.

2. The assembly according to claim 1, wherein said first base comprising an exterior edge extending between each of a top side and a bottom side of said first base, said top side of said first base curving upwardly and inwardly such that each of a front side and a rear side of said exterior edge are directed toward a center of said first base to define said pair of wheel wells, each of said wheel wells extending between a first lateral side and a second lateral side of said exterior edge.

3. The assembly according to claim 2, wherein said first base has a pair of grooves each extending into said top side of said first base such that each of said grooves is positioned on an upper side of an associated one of said wheel wells, each of said grooves extending between said first lateral side and said second lateral side of said exterior edge.

4. The assembly according to claim 2, further comprising a first set of locks and a second set of locks each movably coupled to and extending upwardly from said top side of said first base such that each of said first set of locks and said second sets of locks is positioned on a lower side of an associated one of said wheel wells.

5. The assembly according to claim 1, wherein said second base having an outermost edge extending between a topmost side and a bottommost side of said second base, said topmost side having a seat well extending downwardly therein, a lowermost side of said car seat being positionable in said seat well such that said car seat is removably coupled to said second base.

6. The assembly according to claim 5, wherein:
    each of said legs comprising a respective pair of first arms each slidably coupled to a respective pair of second arms, a coupled end of each of said respective first arms being hingedly coupled to said bottommost side of said second base wherein said coupled end of said respective first arms is each positioned proximate an associated one of four corners of said second base; and
    each of said wheels being rotatably coupled to an associated free end of each of said respective second arms.

7. The assembly according to claim 6, further comprising each of said wheels being positioned adjacent to an associated one of said four corners of said second base when each of said legs is positioned in said retracted position, each of said wheels being spaced downwardly from said second base when each of said legs is positioned in said extended position.

8. The assembly according to claim 1, further comprising:
    said first base having a first set of locks and a second set of locks; and
    each of said first set and said second set of locks engaging a bottommost side of said second base such that said second base is retained on said first base when said second base is coupled to said first base.

9. The assembly according to claim 8, further comprising a release button movably coupled to said first base, said release button being mechanically coupled to each of said first set and said second set of locks, said release button being engaged to release each of said first and said second set of locks from said second base such that said second base may be uncoupled from said first base.

10. A car seat assembly comprising:
- a first base, said first base comprising an exterior edge extending between each of a top side and a bottom side of said first base, said top side of said first base curving upwardly and inwardly such that each of a front side and a rear side of said exterior edge are directed toward a center of said first base to define a pair of wheel wells, each of said wheel wells extending between a first lateral side and a second lateral side of said exterior edge, said first base being configured to be coupled to a vehicle seat;
- said first base having a pair of grooves each extending into said top side of said first base such that each of said grooves is positioned on an upper side of an associated one of said wheel wells, each of said grooves extending between said first lateral side and said second lateral side of said exterior edge;
- a first set of locks and a second set of locks each movably coupled to and extending upwardly from said top side of said first base such that each of said first set of locks and said second sets of locks is positioned on a lower side of an associated one of said wheel wells;
- a car seat configured to support an infant;
- a second base, said second base having an outermost edge extending between a topmost side and a bottommost side of said second base, said topmost side having a seat well extending downwardly therein, a lowermost side of said car seat being positionable in said seat well such that said car seat is removably coupled to said second base;
- a pair of legs, each of said legs comprising a respective pair of first arms each slidably coupled to a respective pair of second arms wherein each of said legs is structured to form a scissor such that each of said legs is positionable between an extended position and a retracted position, a coupled end of each of said respective first arms being hingedly coupled to said bottommost side of said second base wherein said coupled end of said respective first arms is each positioned proximate an associated one of four corners of said second base;
- a plurality of wheels each being rotatably coupled to an associated free end of each of said respective second arms, each of said wheels being slidably insertable into a respective one of said wheel wells such that said second base is slidable laterally with respect to said first base to couple and uncouple said second base and said first base, each of said wheels abutting a support surface such that said seat may be rolled along the support surface after said second base is uncoupled from said first base;
- said second base having a plurality of tabs coupled to and extending upwardly from said topmost side of said second base, each of said tabs being positioned proximate an associated one of said four corners of said second base, each of said tabs slidably engaging an associated one of said grooves such that said second base is maintained in alignment with said first base when said second base is coupled to said first base;
- each of said first set and said second set of locks engaging said bottommost side of said second base such that said second base is retained on said first base when said second base is coupled to said first base; and
- a release movably coupled to said first base, said release being mechanically coupled to each of said first set and said second set of locks, said release being engaged to release each of said first set and said second set of locks from said second base such that said second base may be uncoupled from said first base.

* * * * *